Oct. 12, 1943.  T. P. SIMPSON ET AL  2,331,433
METHOD AND APPARATUS FOR CATALYTIC CONVERSION
Filed Oct. 25, 1940  5 Sheets-Sheet 1

Thomas P. Simpson
John W. Payne and
John A. Crowley, Jr
INVENTORS

BY
ATTORNEY

Oct. 12, 1943.  T. P. SIMPSON ET AL  2,331,433
METHOD AND APPARATUS FOR CATALYTIC CONVERSION
Filed Oct. 25, 1940  5 Sheets-Sheet 3

Thomas P. Simpson
John W. Payne and
John A. Crowley, Jr.
INVENTORS

BY
ATTORNEY

Oct. 12, 1943.　　T. P. SIMPSON ET AL　　2,331,433
METHOD AND APPARATUS FOR CATALYTIC CONVERSION
Filed Oct. 25, 1940　　5 Sheets-Sheet 4

Thomas P. Simpson
John A. Payne and
John A. Crowley, Jr
INVENTORS

BY
ATTORNEY

Oct. 12, 1943.    T. P. SIMPSON ET AL    2,331,433
METHOD AND APPARATUS FOR CATALYTIC CONVERSION
Filed Oct. 25, 1940    5 Sheets-Sheet 5

Thomas P. Simpson
John W. Payne and
John A. Crowley, Jr.
INVENTORS

Patented Oct. 12, 1943

2,331,433

UNITED STATES PATENT OFFICE 2,331,433

METHOD AND APPARATUS FOR CATALYTIC CONVERSION

Thomas P. Simpson, John W. Payne, and John A. Crowley, Jr., Woodbury, N. J., assignors to Socony-Vacuum Oil Company, Incorporated, New York, N. Y., a corporation of New York Application October 25, 1940, Serial No. 362,882

23 Claims. (Cl. 196—52)

This invention is a continuation-in-part of our co-pending application S. N. 321,184, filed February 28, 1940, which in turn is a continuation-in-part of our co-pending application S. N. 162,541, filed September 4, 1937.

The invention relates to apparatus for and methods of conducting reactions in the presence of a contact mass. The invention particularly relates to apparatus for and methods of conducting catalytic conversion of hydrocarbons and of regenerating the catalysts used for the conversion, invention residing in each of the single operations and the apparatus therefor, as well as, in combinations of the single operations and apparatus therefor which afford truly continuous processes and means for carrying out same.

It is known that many operations for the conversion of hydrocarbon materials to other hydrocarbon materials of differing physical and/or chemical properties may be carried out catalytically. Most of these operations are carried out by contacting the hydrocarbon, usually but not necessarily, in vapor form and at high temperature, with a contact mass composed of particles which themselves have a catalytic effect, or which are impregnated with, or act as a support for, other catalytic material of a nature approprite to the result desired. Such operations may contemplate, for example, the conversion of hydrocarbons of high boiling point to those of lower boiling point, or the polymerization or alkylation of light or gaseous hydrocarbons to hydrocarbons of higher boiling point. Other operations of like nature are catalytic dehydrogenation, hydrogenation, desulphurization, partial oxidation and similar conversions of hydrocarbon materials. Moreover it will be obvious that the present invention may be used in certain catalytic processes using solid particle contact masses other than processes of hydrocarbon conversion. The method of operation and apparatus herein disclosed are applicable to all such catalytic conversions and processes and the subsequent regeneration of the catalyst. Of these operations, the vapor phase catalytic cracking of heavier hydrocarbons to gasoline with the subsequent regeneration of the catalyst is typical. Therefore, for convenience and simplification, this specification will hereinafter discuss this typical operation as exemplary, without, however, intending to be limited thereby or thereto except by such limits as may appear in the claims.

In the past such catalytic processes as we are here concerned with have generally made use of reaction chambers containing a fixed body of catalyst or contact mass, through which the reaction mixture is passed, and in which, after the reaction has slowed down to an uneconomical point, the contact mass is regenerated in situ. Such "catalyst-in-place" processes are not truly continuous, and a complete unit only attains continuity by the provision of numerous reaction chambers which are alternately placed on stream and on regeneration by intricate scheduling and control systems.

It is an object of this invention to provide a feasible apparatus for and method of conducting a continuous catalytic operation in which the catalyst moves in a continuous circuit through the catalyst reaction then through a regeneration reaction and then back to the catalyst reaction.

Another object of our invention is to provide a feasible process of conducting catalyst regeneration wherein the catalyst is moving during regeneration and which is capable of efficiently handling large quantities of catalyst.

Still another and most important object of our invention is to provide a feasible apparatus for and process of carrying out any of the above objects of our invention in which a catalyst may be used that is composed of particles of relatively small size such as granules and fines of say 20 or 30 mesh and finer, rather than pellet particles of larger size such as certain cracking catalysts now used in catalyst-in-place operations.

Other objects will in part be obvious and in part appear from the following description of our invention.

The present invention comprises the novel elements of construction, combination of elements and methods disclosed herein, and may be considered a specific embodiment of the generic invention disclosed in our co-pending application S. N. 162,541.

In one embodiment our invention comprises the apparatus for and method of conducting a truly continuous catalytic operation by flowing the catalyst through a catalytic reaction zone in contact with a flowing stream of the reactant, withdrawing spent catalyst from the zone, flowing the spent catalyst through a baffled regenerating zone in contact with a gaseous regenerating agent while circulating a fluid heat exchange medium of suitably controlled temperature within sufficiently close proximity to, and in indirect heat exchange relationship with, every particle of spent catalyst during the entire time it is being regenerated that the temperature of all such particles being regenerated may be maintained within a suitable regenerating temperature range without any deleterious temperature being created, withdrawing regenerated catalyst from the regenerating zone and returning the regenerated catalyst to the reaction zone. In another embodiment our invention comprises regenerating suitable spent catalysts in general, whether derived from a continuous reaction or not, by a method similar to that outlined in the above mentioned continuous combination embodiment.

An outstanding feature of this invention is the feasibility with which catalyst composed of relatively small particles, e. g., 20 or 30 mesh and finer, may be used. The invention is particularly (but not exclusively) adapted for use of catalysts composed of small particles because it provides proper baffling of the flowing particles to permit feasible passage of a gaseous agent through the chamber. This baffling should afford substantially continuous, catalyst-free gaseous passages through the flowing catalyst which permit the gas or vapors flowing therethrough to directly contact the flowing catalyst; or, at least, the baffling should re-distribute the particles and gaseous material at sufficiently frequent intervals that the gas or vapors pass through the chamber without causing the rate and direction of flow of the particles to be unduly disturbed whereby troubles such as "boiling" of the clay do not occur. These desires may be accomplished by not requiring the gaseous agent to force its way through any substantial depth of unbaffled particles.

We have found that during regeneration of spent catalysts, such as alumina-silica cracking catalysts, a heat exchange medium should be used in order to obtain practical results. We have found further that only by using a suitably temperature-controlled, circulating fluid heat exchange medium and distributing it in close proximity to each and every particle, as discussed in detail hereinafter, can proper temperature control for regeneration be effected. Since cracking is an endothermic reaction and also conducted at a lower temperature, the use of a heat exchange medium for closely controlling the cracking temperature is not absolutely essential and, therefore, it can be eliminated or provided for in this reaction, whichever is desired.

We have made a further important discovery in connection with the application of our invention to the catalytic cracking of petroleum oils. We have found that when petroleum vapors are flowed under cracking conditions countercurrently through a flowing stream of the catalyst in such manner as to provide long paths of flow, a slightly higher yield of gasoline is obtained than in a catalyst-in-place operation, and, equally important, a gasoline is obtained which has a substantially lower acid-heat value. It is probable that the above improvements are obtained because better contact between the vapors and catalyst is had, less vigorous reaction occurs, and a certain amount of reforming is obtained in addition to cracking as a result of the reacted portions of the oil contacting progressively fresher catalyst.

For a fuller understanding of the invention reference is now made to the accompanying drawings showing preferred embodiments of our invention wherein.

Figure 1:
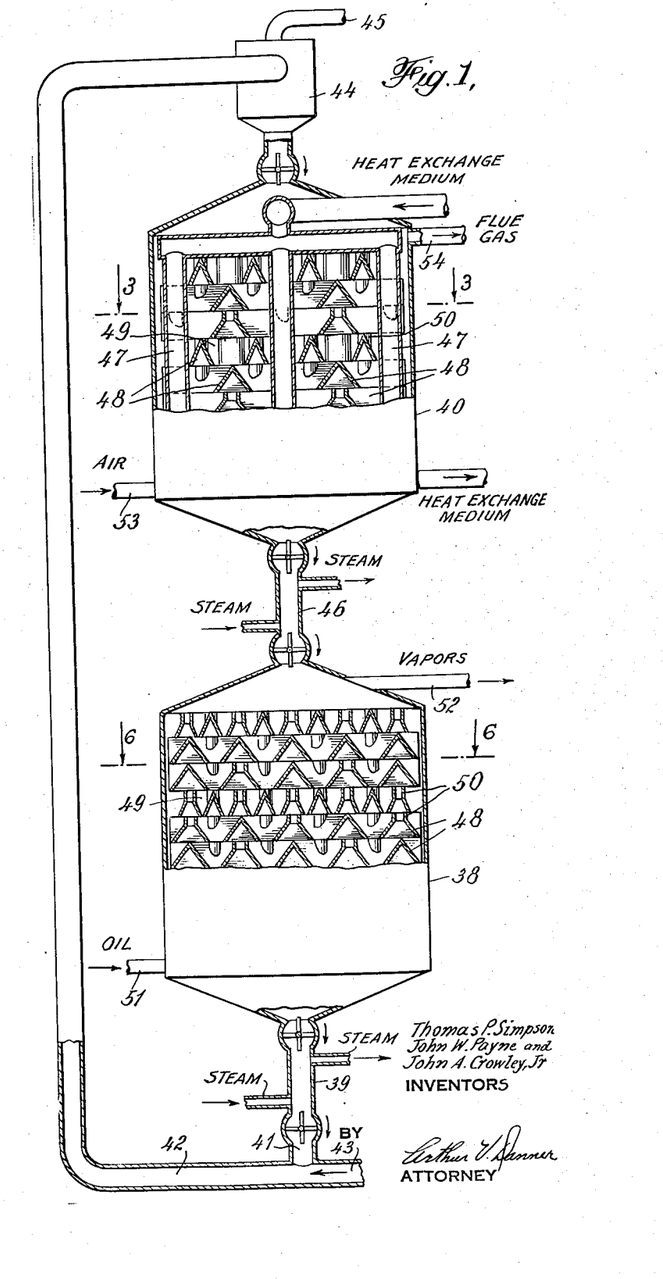
Fig. 1 is a longitudinal sectional view of a preferred form of the combination apparatus.

Referring to Fig. 1, there is shown a regeneration case 40, a purging section 46, a reaction case 38, a second purging section 39, and a conveyor 42 for sending spent catalyst from the reaction case to the regeneration case. As shown the catalyst is conveyed through 42 by means of a gas stream. However, it is to be understood any other suitable conveying means may be used such as a bucket conveyor. Further, as shown, the regeneration case is positioned above the reaction case although such positioning may be reversed or any other suitable positioning of the two cases may be used.

In operation catalyst flows in turn down through reaction case 38, purge section 39, and then falls through line 41 into line 42. In line 42 the catalyst particles are carried along in suspension by a suitable gas admitted under pressure at 43, and carried by the gas up to cyclone separator 44 where the carrying gas is separated from the particles and passes out through flue 45. The catalyst particles separated out in 44 flow down into and through regeneration case 40 and then into purging section 46 from which they again pass into case 38 to repeat the cycle. An inert gas such as flue gas should be used as the conveying medium in conveyor 42, since the particles dropping through line 41 to line 42 are usually at a temperature higher than the kindling temperature of carbonaceous impurities on the catalyst. It is to be noted that the catalyst passing from each case to the other will not be permitted to cool down to atmospheric temperature but rather will be maintained in a heated condition at all times in this cyclic process. By passing the catalyst to the next case while still in a heated condition a material advantage in operation is obtained in that time and space in the cases are not required for merely heating the catalyst up to the desired treating temperature or at least in heating the catalyst all of the way from atmospheric temperature up to the treating temperature.

Since in the usual operation hydrocarbon oil is the gaseous agent in the reaction case and air is the gaseous agent in the regeneration case, it obviously is necessary to pass the catalyst from one case to the other without permitting any substantial intermingling of the gaseous agents in the two cases. For this purpose we disclose in Fig. 1 conventional star wheel valves for admitting and discharging catalyst to and from each case. It is apparent any other means which will accomplish the desired result could be used.

Because of the same reason we provide purging section 46 for the regenerated catalyst passing from case 40 to case 38 and purging section 39 for spent catalyst passing from case 38 to case 40. In these purging sections a purging agent, usually steam although other agents may be used, is forced through the flowing particles to remove occluded vapors or gases (or liquid if such should be used instead of vapors in a reaction case). Thus in purging section 46 any air retained in the catalyst flowing from the regeneration case 40 will be removed before such catalyst passes to case 38, and, in purging section 39, any hydrocarbon vapors retained in the catalyst flowing from the reaction case 38 will be removed before such catalyst passes to case 40. It is to be understood that in the event either or both purging operations are found to be unnecessary they may be eliminated.

One of the most important features of the apparatus disclosed in Fig. 1 is the internal structure of the regeneration case 40 which is designed for handling particularly catalyst composed of relatively small particles, e. g., 30–60 mesh particles. We have found, as stated above, that in order to regenerate catalysts composed of such small particles in the most feasible and satisfactory manner wherein the particles are flowed countercurrent to the gaseous regenerating agent, two principal requirements must be present, namely, suitable heat conducting passage means for circulating temperature-controlled fluid heat exchange medium in indirect heat exchange with the particles, and suitable baffle means for the catalyst and gaseous regenerating agent.

The heat conducting passage means should be so arranged as to keep sufficient circulating fluid heat exchange medium of controlled temperature within sufficiently close proximity to, and in indirect heat exchange with, each and every solid particle in the zone throughout their entire presence in the zone that proper temperature control of each particle may be had. The particular distribution or provision of the fluid heat exchange medium throughout the zone is especially important and will be discussed more in detail hereinafter.

The baffle means should be such as to (1) cause all the solids to have about the same length of flow through the zone, (2) aid in heat transfer (3) provide suitable passages for the gaseous agent up through and in direct contact with the catalyst particles and (4) force the gaseous agent to take such a route through the zone so that high rates of gas flow may be used without having any substantial effect on the general direction the particles are moving. The functions of the baffle means set forth in (3) and (4) are increasingly important the finer the particle size of the solids.

Several structural means may be devised whereby the above requirements in the preferred embodiment may be provided. A particularly efficient means is shown for the internal structure of case 40 in Fig. 1. This type structure is also shown more in detail in Figs. 2 and 3. In this arrangement, there are shown the vertical heat exchange medium carrying tubes 47 distributed through the case. The distribution of these tubes will be discussed in detail hereinafter. Between tubes 47 there are shown various short pieces of light angle iron designated 48. These pieces of angle iron are so arranged that their length is placed horizontally and their angle is open downwardly. Placed in this manner between the heat exchanger tubes 47, the angle irons 48 of each layer being disposed transversely to those on the layer below, each angle iron serves to receive the catalyst descending from above and to distribute that catalyst laterally in planes at an angle to those planes in which the catalyst was moving when it first encountered the particular angle iron in question. Also the form and placement of these angle irons and the manner in which they surround the heat exchange tubes 47 causes catalyst particles in their downward flow to repeatedly pass through annular spaces 49 (see Figure 3), which annular spaces 49 surround the heat transfer medium tubes and bring the adsorbent into even closer heat transfer relationship with the heat transfer medium in said tubes.

Figures 2, 3, 4:
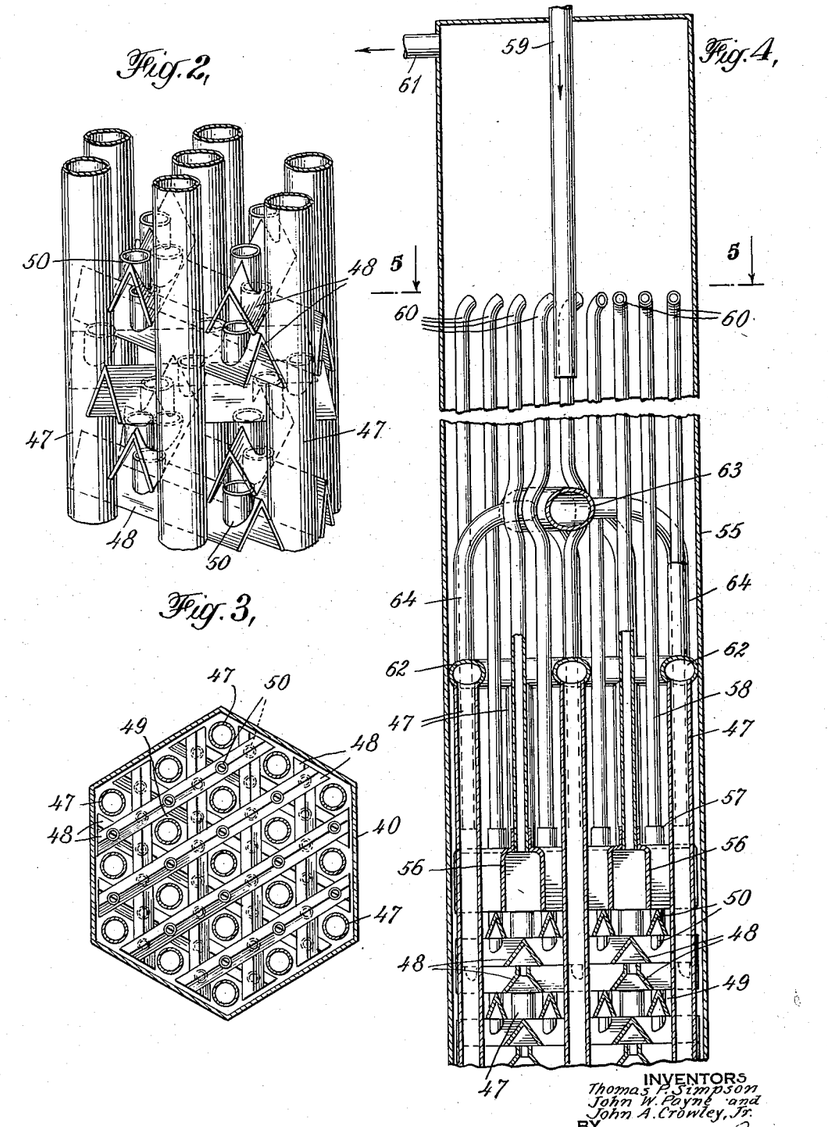
Fig. 2 is a perspective view of a part of the internal arrangement of the regeneration case shown in Fig. 1.
Fig. 3 is a cross-section of the regeneration case shown in Fig. 1 taken on the line 3—3.
Fig. 4 is a partial longitudinal section of another form of case of the type shown in Fig. 1.

Ascending air in case 40 is trapped beneath each piece of angle iron. To prevent its flow being concentrated at the ends of the angle irons against the walls of the chamber, each angle iron is pierced at several points along its heel forming a series of orifices 50, these orifices being so located that those in one angle iron will be directly below the closed part of the next above angle iron which crosses this part of the first-mentioned angle iron. In this manner each orifice distributes air into the space beneath the angle iron above it, yet air cannot pass directly upward through another higher orifice. In short, the arrangement is such that these orifices when assembled are not in register.

It will be seen that by the above arrangement the gas passes in a tortuous path up through the chamber in a substantially particle-free path, and, at the same time, the gas is in direct contact with the catalyst flowing along the bottom boundaries of the vapor passages. The result of this arrangement is a very effective distribution and re-distribution and contacting of both down-flowing catalyst and upflowing air, coupled with an effective bringing of the catalyst into indirect heat transfer relationship with the medium flowing within tubes 47. Furthermore the use of relatively high air velocities is desired for practical regeneration. One of the prime features of baffles 48 is that they provide separate paths for the gas and permit the use of rather high air or gas velocities without "boiling" or blowing the small particles of clay or other material out of the apparatus. A baffle arrangement might be used which permitted rising gaseous agent periodically to pass or force its way directly up through small portions of downflowing particles; however, in such event the sheltering of the gas flow and redistribution of the particles should be at such frequent intervals that no difficulties are encountered in the portions unbaffled.

Figure 6:
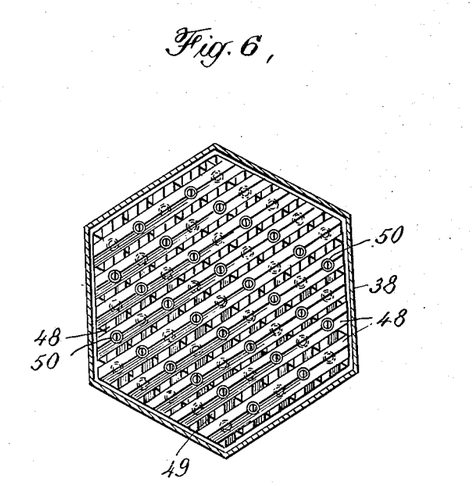
Fig. 6 is a cross-section of the reaction case shown in Fig. 1 taken on the line 6—6.

Another important feature of the apparatus shown in Fig. 1 is the cracking case 38. The construction of this case is likewise designed to handle particularly catalysts composed of relatively small particles which flow countercurrent to the petroleum vapors or the like, and, therefore, the cracking case contains baffling structure equivalent to that of case 40 and may be of substantially the same dimensions. In fact, as shown, case 38 is provided with the same angle iron baffles 48 as used in case 40, and the angle irons are arranged in the same manner. Now reaction case 38 may be of exactly the same structure as regeneration case 40, if desired; however, since a heat exchange medium is not absolutely essential for controlling cracking case 38, it is preferred to use a case such as shown in which no tubes are provided, the additional space caused by the elimination of the tubes being baffled with the angle irons (see Fig. 6). A convenient way of constructing cracking cases of the type of case 38 for assembling, is to prepare convenient size bundles of angles 48 which fit the cross-dimensions of the case, and then these convenient bundles may be inserted to fill up the case. It also is to be understood the reaction or cracking case may be of any other suitable design wherein the catalyst may be flowed therethrough feasibly, as for example, a case in which the catalyst flows through suspended in the hydrocarbons.

In Fig. 1, oil (or other reactant) preferably enters through 51 and leaves through 52 of case 38, and, in case 40, air (or other gaseous regenerating agent) preferably enters through 53 and leaves through 54. In this way countercurrent flow is had whereby greater ease of temperature control is afforded. Thus in case 38 fresh catalyst at the top contacts substantially processed oil, and fresh oil at the bottom contacts substantially spent catalyst; and, in case 40, spent catalyst at the top containing high percentages of combustible material contacts flue gas low in oxygen, and fresh air at the bottom of case 40 contacts substantially regenerated catalyst with low carbonaceous content. As a result tendencies to have exceptionally rapid reactions are avoided whereby the temperature control is less difficult.

In Fig. 4 we show another form of case containing baffles of the above mentioned angle iron type, which case, as shown, is particularly suited for regeneration reaction but, as the other regeneration cases shown, may be used for cracking operations, as shown, or as modified by removal of heat transfer tubes with baffle replacement for the additional spaces. Since case 55 of Fig. 4 is similar to case 40 of Fig. 1 in many details, the same reference numerals are used for identical parts. Case 55 is equipped with tubes 47 arranged as in case 40 of Fig. 1. Angle iron baffles 48 are placed in case 55 as in case 40 of Fig. 1. Case 55 is modified, however, in its top portion by providing channel members 56 transversely across the top row of angle irons so that they cover in row form orifices 50 of the angles opening to the top of the chamber and thereby collecting the rising air. Channel members 56 are provided with orifices 57 to which are attached pipes 58 which lead upwardly to a point above the catalyst inlet opening of the pipe 59. This latter arrangement prevents the rising air from blowing the newly entering catalyst, which is above the angle irons, out of the chamber.

Figure 5:
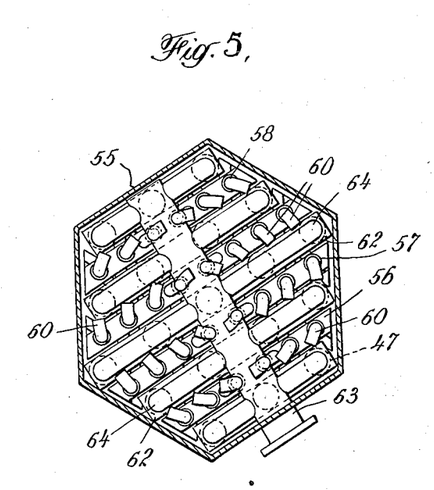
Fig. 5 is a cross-section of Fig. 4 taken on the line 5—5.

A further feature of air pipes 58 is the curved upper end 60. The upper ends of all of the air pipes 58 are bent outwardly in such fashion as to force the emerging air to flow in a rotary manner thereby forming a centrifugal separator within the chamber (see Fig. 5), and, as a consequence of which, any finely divided particles or dust carried by the air, are separated out and drop back down while the particle-free air passes on up and out flue 61 which is placed a sufficient distance above ends 60 to permit proper separation. If desired, an outside separator might also be used; also the air pipes 58 might lead up to the flue or outlet containing an external separator.

A different type of header for tubes 47 is also shown in Fig. 4 in which pipes 62 serve as manifolds to connect up rows of heat exchange tubes 47. Manifolds 62 are all in turn connected to a single master manifold pipe 63 through curved pipes 64 (see Fig. 5). The master manifold pipe 63 connects with a pipe of an external heat transfer medium circuit wherein the medium's temperature may be controlled (see Fig. 10). A similar header at the bottom of the chamber 55 connects with a pipe of the external circuit in order to provide a complete circuit.

Figures 7, 8:
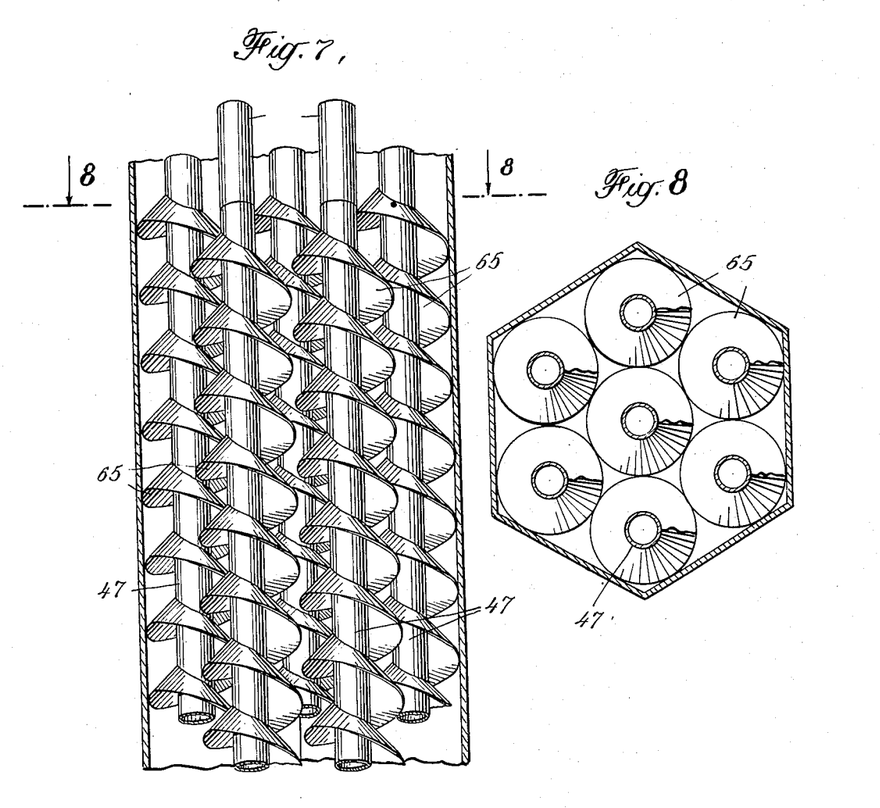
Fig. 7 is a partial longitudinal section of an optional internal arrangement that may be used in the cases shown in Fig. 1.
Fig. 8 is a cross-section of Fig. 7 at the line 8—8.
Figure 9:
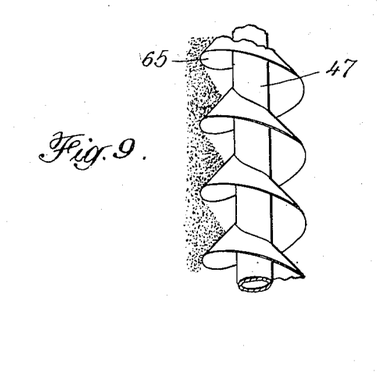
Fig. 9 is a detailed view of the type internal case structure shown in Fig. 7 and including some catalyst particles; and, Fig. 10 shows in diagram how the combination apparatus of this invention may be set up in operating form.

As stated above, several structural means may be devised for effecting the desired baffling when treating a flowing stream of a catalyst composed of relatively small particles with a countercurrently flowing stream of gas. In Figs. 7 to 9 we show another baffle structure comprising winding fins which may be used in place of the angle iron baffles shown in the cases of Figs. 1 to 6. In fact, the fin baffles of Figs. 7 to 9 have certain advantages over the angle irons in that being welded to the tubes they give greater heat exchange surface to the tubes themselves, and, moreover, this fin structure has certain advantages from the construction standpoint.

In Fig. 7, tubes 47 are provided and arranged in a manner similar to that shown in the cases of Figs. 1 to 5, but instead of placing angle irons between the tubes, as in Figs. 1 to 6, a metal fin 65 is welded to each tube, the fin being wound continuously along the tube as shown. It will be seen in Fig. 8 that the external peripheries of the fins of adjacent tubes are in vertical alignment. From what we have disclosed herein it will be apparent that for best results these fins should be either so arranged or actually overlapping. In other words, there should not be any substantial cross area in the chamber above and below which, in a straight vertical line through the length of the chamber, there is no baffling, since otherwise there would be "short-circuiting" of the catalyst in this area, and the catalyst in the center of this area might not be kept sufficiently close to heat exchange surfaces. Of course, there might be a slight amount of this vertically free area before appreciably inferior results are encountered.

The object of having the fins wind along each tube is to provide winding susbtantially continuous, particle-free gas passageways up through the case underneath each fin, which permit gas therein to directly contact the particles along at least one edge of the passageways. The fins may have any desired form which accomplishes this object. In the preferred operation catalyst fills the case moving therethrough in substantially a solid column, and, therefore, lies along each tube as seen in the detailed view of Fig. 9, forming an "outer side wall" to the gas passageways where the gas and catalyst are in direct contact. A further feature may be provided by using baffles of mesh wire construction, the mesh of which is too fine to permit passage of particles, and, thereby, the burning or reacting surface of the chamber is practically doubled since the burning or reaction not only occurs along the above mentioned "outer side wall" but also along the face of the baffles (see Fig. 9).

While the fins might be positioned at right angles to the tubes or even slanted slightly upward, most efficient results are had by slanting the fins downwardly to give them a slope which is at least as great as the angle of repose of the particles being used. On the other hand the slope should not be too great, as the size of the gas passage is thereby reduced. We have found a slope of about 45° to be quite satisfactory for most uses. The pitch of the continuous spiral or helical fin should not be so great that the particles more or less fall straight through the case, but rather should be at a more moderate pitch so that the particles substantially ride the baffles. It may be found of advantage to have adjacent fins of opposite winding so that particles riding down thereon will be traveling in opposite directions, collide and thereby effect more thorough redistributing.

Certain of the baffle structures shown herein are similar to those disclosed in the co-pending applications S. N. 279,008, filed June 14, 1939, now U. S. Patent 2,226,578, and S. N. 328,243, filed April 6, 1940, now U. S. Patent 2,226,535, which cover treating apparatuses broadly.

Figure 10:
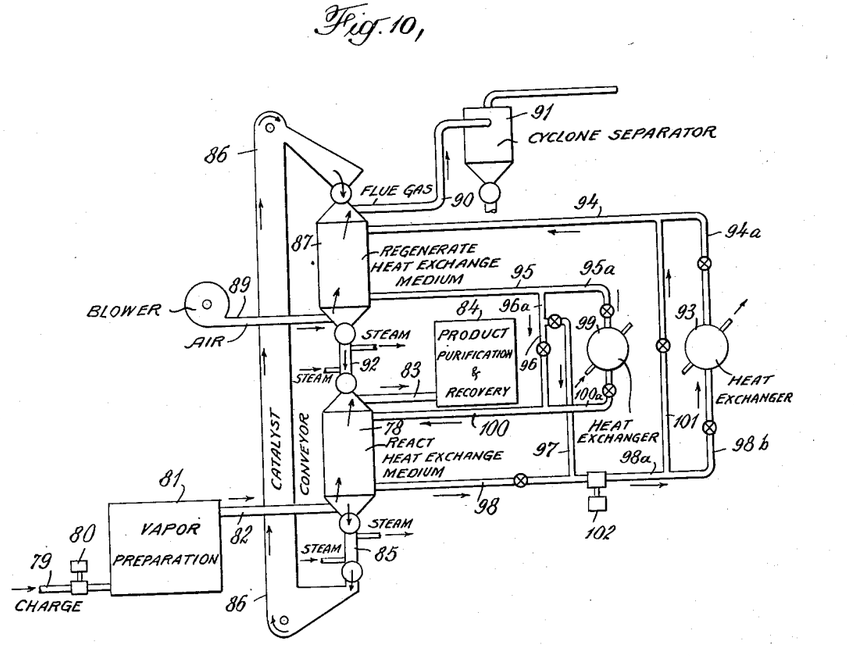

In Fig. 10 we show a diagram of essentially a complete exemplary set-up of a typical arrangement of the combination embodiment of our invention when used for cracking oil. Oil for the catalytic reaction case 78 will be fed through pipe 79 by pump 80 to, if desired, a vapor preparation unit 81. Vapor preparation unit 81 will consist essentially of a heater, for which purpose any of the usual forms of heaters common in the art, say a pipe still, may be used to vaporize the charge and heat it up to reaction temperature; and, if the charge used is not wholly vaporized at the reaction temperature, a vapor separator to remove unvaporized liquid residue may be included. Vapors from unit 81 move through pipe 82 into and up through reaction case 78 wherein they undergo catalytic reaction. Reaction products pass through pipe 83 to product purification and recovery equipment 84. Equipment 84 may be made up of any of the usual fractionation, separation and disposal devices currently in common use for handling products of cracking reaction. If necessary, recovery equipment 84 may also include a separator, such as a cyclone separator, for removing small catalyst fines from the vapors. If desired, fractions boiling above the desired low boiling product may be returned to the system for re-treatment, either separately or in admixture with fresh charge.

Catalytic material flows down through case 78 into purge section 85 where it is purged. Catalyst leaving 85 is elevated by conveyor 86 into regeneration case 87, wherein it is regenerated as it flows down through 87 by burning with air or other suitable carbonaceous oxidizing gas supplied by blower pipe 89. Products of regeneration are disposed of through pipe 90 leading to separator 91. The regenerated catalyst leaving the bottom of case 87 is purged in 92 and returned to case 78.

In the preferred embodiment of the invention heat exchange medium would only be used in the regeneration case, e. g., case 87 in Fig. 10. Accordingly, in such an embodiment, as shown in Fig. 10, using heat exchange medium in the regeneration case only, fluid heat exchange medium, the temperature of which is controlled by heat exchanger 93, would be circulated from exchanger 93 through pipes 94a and 94 to case 87, then through the case 87 and back to exchanger 93 by way of pipes 95, 96a, 97, 98a and 98b. In such an embodiment no other external system for heat exchange medium would be provided.

However, since in some instances it may be desired to use heat exchange medium in the reaction case also, suitable means therefor, are also shown in Fig. 10. In fact, as shown in Fig. 10, the same heat exchange medium is used for both catalyst cases whereby the excess heat picked up by the medium in the regeneration case may be made use of in the reaction case for heating. Thus, as shown, heat exchange medium withdrawn from case 87 through pipe 95 is passed through pipes 96a and 96, or through pipe 95a, heat exchanger 99 and pipe 100a, into pipe 100 and then into and through reaction case 78. Heat exchange medium withdrawn from case 78 passes back to chamber 87 through pipes 98, 98a and 98b, heat exchanger 93 and pipes 94a and 94. If desired, part or all of the heat exchange medium may be by-passed around heat exchanger 93 through pipe 101. Circulation of the fluid heat transfer medium is effected by means of pump 102.

The size of the catalyst particles that may be used in the embodiments of our invention may vary over a wide range. However, in view of the fact most so-called pellet size catalytic particles, e. g., rods 2½ x 4 mm., are rather frangible, it is preferred to use smaller catalytic particles, such as 20 or 30 mesh or smaller. Again, it is preferred to use catalytic particles larger than about 100 mesh so that their flow is not disturbed too easily by the flow of the gaseous agent.

In all operations of our invention it is always desirable to have at least the regenerating chamber filled with the catalyst particles so that they move in substantially a solid column down through the chamber, as otherwise improper heat control may result. Therefore while the chamber might be operated without filling the chamber it is only at the probable expense of best results. Further, as stated above, the cyclic process should be operated so that catalyst is not permitted to cool to atmospheric temperature in passing from one case to another, but rather for economical reasons should be passed preferably to the next case while retaining heat acquired in the preceding case. In some operations it may be found desirable or necessary to place catalyst surge tanks or the like in the catalyst flow lines in order to give greater flexibility to the timing of the operations. If advisable in such operations, means for heating the catalyst at these stages may be provided so that it retains a heated condition.

In order to obtain proper temperature control, the heat exchange medium must be adjusted to a proper temperature, for extracting or adding the necessary heat. Moreover, heat exchange medium must be circulated in sufficient amount in close indirect heat exchange with every catalyst particle and then cooled or heated to readjust its temperature by means extraneous of the reaction heat before the medium's temperature reaches an undesired value. In this way the heat exchange medium in our invention continuously controls the temperature of the zone making immediate compensations for temperature changes whereby no deleterious temperatures occur.

When the operation is first started the heat exchange medium may add some heat to help initiate combustion or at least the medium should not be at such a low temperature as to prevent combustion initiation. After combustion is started, operations by our invention are so efficient that heat is extracted from the exothermic regeneration reaction, i. e., in the usual case such as regeneration of cracking catalysts by burning. Therefore contrary to many processes of burning which add heat, e. g., by hot combustion gases of exceptionally high temperatures, and thereby endanger the catalyst or reaction by overheating, our invention employs a heat exchange medium which is maintained at all points in the regenerating zone at a temperature below temperatures which are injurious to the catalyst or to the regeneration being carried out, and, of course, at a temperature above which undue cooling occurs.

While temperature-controlled, circulating gaseous heat exchange mediums of high specific heat might be used in some instances, we greatly prefer the use of liquid heat exchange mediums since necessary pumping and pressure facilities for proper use of even the best gaseous mediums, e. g., hydrogen, would, in many cases, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of cracking catalysts, we prefer the use of fused salts. A particularly preferable mixture of this kind is a mixture of the alkali metal salts of nitric and nitrous acids. In certain cases suitable liquid heat exchange mediums might be found which have a boiling point around the desired operating temperature, in which case, the heat exchange medium would be kept predominantly in the liquid state but might undergo some transition whereby advantage could be taken of its heat of vaporization or condensation.

In the preferred practice the heat exchange medium is maintained at substantially the temperature of the treatment being controlled, e. g., above the minimum temperature at which proper reaction is obtained and below the minimum temperature at which deleterious results occur such as damage to the catalyst. Such practice may be carried out very effectively when the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and suitable cooling or heating of the heat exchange medium in its circuit maintains the liquid at the treating temperature.

A further advantage in this practice results from the complicated structure of apparatuses for affording proper temperature control. The structure involves an exposure of large amounts of heat conducting walls. When two widely different temperatures are maintained on different sides of these walls thermal expansion difficulties may arise causing buckling, etc. However, when substantially the same temperature is maintained throughout, the apparatus operates without strain or difficulty.

As has been indicated hereinabove, one of the important features of the present invention is the provision of a regeneration zone wherein a temperature-controlled liquid heat exchange medium is circulated in indirect heat exchange with, and is maintained at all times within sufficiently close proximity to, each and every catalyst particle in the regenerating zone that a proper regenerating temperature can be maintained without any deleterious temperatures being created. Obviously this maximum distance that each catalyst particle might be from the liquid heat transfer medium may vary with the catalyst treated, the atmosphere in the burning zone, the amount and nature of impurities being removed, mass velocity of gaseous regenerating agent, physical properties of the liquid heat transfer medium, etc. Accordingly, it would be difficult to specify one maximum distance that may be used for every regeneration. However, in general, this maximum distance should not exceed about 1½ to 2 inches in any regeneration case in order to afford proper temperature control, and a maximum distance of about 1 to 1½ inches seems to be well suited for the regeneration of spent clay cracking catalysts. The hydraulic radius (i. e., cross area not occupied by heat exchange equipment measured in square inches divided by perimeter or length of heat transfer surface in that area measured in inches) of the case at all points along the regenerating portion thereof should be below about 3 inches, and, preferably for cracking catalyst regeneration, should be around 0.5 to 1.0 inch or lower.

In the regeneration of a spent cracking catalyst with air, the rate of heat liberation per unit of time per unit of volume is a function of the mass velocity of catalyst, of the amount of "carbon" to be burned therefrom and of the mass velocity of the air. Experimentation has established that optimum conditions of burning for countercurrent flow occur in those ranges of mass velocities wherein the catalyst particles are almost supported by the rising air, the upper limit being, of course, at air velocities so great that particles of the size being regenerated will not fall, but will float. Since this velocity will vary with the apparent specific gravity of the particles, which apparent specific gravity is a function of the real specific gravity and the particle size, the limiting velocity is not a single velocity, but a range, defined as above. The inter-relation of catalyst rate, "carbon," and air rate may be expressed best as that combination of rates, which in the case of clay cracking catalysts, for example, while not exceeding a temperature of about 1050° F. under conditions of operation, will remove carbon at the rate of about 1% by weight of catalyst to about 10% per hour for a broad range and from about 3% to 6% for preferred operations.

The mass velocity of the liquid heat transfer medium, of course, depends upon the specific heat and other characteristics of the medium. In operations where it is desirable to maintain the adsorbent at a relatively uniform temperature, the mass velocity is best defined as that mass velocity of heat exchange medium which will extract the required amount of heat while undergoing a temperature rise of not greater than about 50° F. and preferably of from 2° to 10° F.

In order to show specific application of our invention to the construction and operation of catalyst regeneration cases, we give in Table I below specific data for a regeneration case that embodies a highly satisfactory construction of the present invention. The particular data given is for practical regeneration of a clay cracking catalyst carrying up to about 3% of coke and using a molten salt heat exchange medium. It is to be understood the invention is not limited by the data of Table I as there may be variations as indicated elsewhere herein;

Table I

| | |
|---|---|
| Length of case | feet 25 |
| Diameter of case | do 8 |
| Length of catalyst path | do 35 |
| Size of heat transfer tubes | inches O. D. 1 |
| Spacing of tubes (triangular) | inches 3 |
| Hydraulic radius of heat transfer | do 0.6 |
| Volume of chamber occupied by clay per cent | 50 |
| Diameter of holes in angle irons | inches 1 |
| Air clay contact surface (sq. in./cu. in. clay) | 1.25 |
| Maximum distance of clay particles from heat exchange surface | inches 1.25 |
| Coke burning rate (per cent by weight of catalyst) | 3.0 |
| Clay throughout (#/hour/cu. ft. of free chamber space) | 20 |
| Air rate (cu. ft./min./cu. ft. of free chamber volume) | 2.5 |

As stated above the maximum distance which any catalyst particle may be from liquid heat exchange medium during regeneration in accordance with our invention and the minimum amount of heat transfer surface and liquid heat exchange medium may vary somewhat depending on certain factors. As a preferred range which will be found satisfactory for most regenerations we give the following data in Table II.

Table II

| | |
|---|---|
| Maximum distance of particles from heat exchange surface | inches 0.6–2.5 |
| Hydraulic radius | do 0.3–1.5 |
| Amount of liquid heat exchange medium in chamber per unit volume of space for catalyst and gas | 0.1–0.3 |

As to the maximum distance of particles and the maximum hydraulic radius value (i. e., largest numerical value), it is preferable, of course, from the economic standpoint to use the largest value possible in order that the least possible amount of heat transfer surface may be used which will give the desired results.

It will be understood that, while best design and operation in accordance with this invention is obtained by observing the limits and ranges set forth above, a gradual approach to such limits and ranges will naturally begin to produce some of the advantages obtained by the present invention. There is, therefore, a borderline range of relationships which do not yield the results obtainable by practice of the preferred form of the invention but within which some of the advantages of the invention begin to be realized. For the purpose of defining this borderline range we give below figures defining relationships beyond the limits of which operating difficulties would arise which would seriously impair the efficiency of the process or would increase the cost to a most undesirable level as compared with our preferred design and operation.

Table III

| | |
|---|---|
| Maximum distance of particles from liquid heat exchange medium | inches 0.3–5.0 |
| Hydraulic radius | do 0.15–2.5 |
| Amount of liquid heat exchange medium in chamber per unit volume of space for catalyst and gas | 0.05–0.6 |

As has been mentioned hereinabove, a further surprising and important advantage is obtained by our method of cracking petroleum oils over efficient catalyst-in-place, cracking operations with the same type catalyst. By our process of using countercurrent flow of the catalyst and petroleum vapors a higher yield of gasoline is obtained, and, equally important, the gasoline produced by our process has a very substantially lower acid-heat value as may be seen from Table IV below.

Table IV

| | In situ | Counter-current |
|---|---|---|
| Vol. oil/vol. cat./unit of on stream time | 0.20 | 0.25 |
| Yield (300° F. E. P. gasoline) per cent | 32.0 | 37.8 |
| Acid heat (300° F. E. P. gasoline) ° F | 48 | 22 |
| Yield (410° F. E. P. gasoline) per cent | 48.0 | 55.7 |

In order to obtain the above advantages in cracking, it appears several requirements must be met. First, the catalyst must be moving so as to obtain more efficient contact; second, the catalyst and petroleum vapors must be moving countercurrently so that the petroleum vapors progressively encounter fresher catalyst; third, the path of flow of catalyst and petroleum vapors should be relatively long so as to provide uniform contact; and, fourth, the time of contact should be increasingly long the larger the size of the catalyst particles and, therefore, it is more practical to use catalysts composed of relatively small particles, e. g., 20 or 30 mesh or smaller.

Since the amount of contact for a given length of path varies with the amount of voids and also the particle size, and since the amount of contact would also vary with the rate of flow of both catalyst and oil, the nature of the catalyst and oil, etc., it would be difficult to specify a minimum length of path for all operations that would give applicants' improved results. However, as the improvement is so definite, the proper length of path may be easily ascertained for any particular cracking. Thus the length of path in our present counterflow of catalyst and oil process should be sufficient to give a substantially improved gasoline product in yield and acid heat value (i. e., higher yield and lower acid heat) per volume of oil per volume of catalyst per unit of on stream time over that obtained per volume of oil per volume of catalyst per unit of on stream time using a similar oil and catalyst but maintaining the catalyst in place during the cracking.

The catalytic cracking of petroleum oils to gasoline may be conducted at temperatures in the catalyst mass between about 810° F. and about 950° F. and preferably between 825° F. and 900° F., as is well known in the art. When cracking by passing petroleum vapors in contact with a flowing stream of catalyst as disclosed herein, the rate of flow of the petroleum vapors is governed by the same mechanical principles and limits set forth herein for the rate of flow of a gaseous regenerating agent.

The temperature of regeneration of a spent clay cracking catalyst ranges from around the cracking temperature up to a peak temperature of about 1050° F., the most efficient and effective regeneration being accomplished during the time the spent catalyst is at a temperature between about 1000° and 1050° F. However, great care should be exercised that no catalyst particles are subjected to a temperature much above 1050° F., e. g., above 1200° F., or serious damage to such catalyst particles may result. It is to be noted further that because the regeneration case is always on regeneration, and, therefore, each part of the case remains at substantially a given temperature, it is not necessary to use preheated air as air at atmospheric temperature may be introduced into the case quite feasibly. However, the use of preheated air is preferable as it increases the capacity of the case.

In discussing the cases provided with fluid heat exchange medium, they have been referred to principally with respect to regeneration, however, it is to be understood any or all may, if desired, be used for carrying out catalytic reactions such as catalytic cracking. Again we have shown several exemplary continuous combination set-ups, and it is to be understood any of our regeneration operations may be conducted in combination with any of the disclosed catalytic reaction cases and that various similar set-ups may be provided for any of the combinations.

We claim:

1. A continuous catalytic conversion unit for conversion of a hydrocarbon oil reactant with a catalyst composed of solid particles followed by regeneration of the spent catalyst with a gaseous regenerating agent reactant wherein conversion may be continuously carried out in one element without interruption comprising a conversion chamber constructed so that said catalyst particles may be flowed through said chamber in its normally operative form, means to simultaneously flow said hydrocarbon reactant countercurrently through said chamber in direct contact with said particles, baffle means disposed throughout the conversion portion of said chamber, said baffle means being disposed so as to force substantially all catalyst particles and hydrocarbons passing through the chamber to follow a tortuous path and so as to form substantially continuous, particle-free passages for the hydrocarbons through the moving particles which passages permit hydrocarbons therein to directly contact the particles along at least one surface of said passages, means to pass spent catalyst from said conversion chamber to a regenerating chamber out of reactant communication with said conversion chamber, said regenerating chamber being constructed so that said spent catalyst may be flowed downwardly therethrough in its normally operative form, a plurality of heat conducting tubular members positioned within said regenerating chamber and adapted to carry a circulating liquid heat exchange medium in indirect heat transfer relationship with particles flowing through said regenerating chamber, the structure and positioning of said tubular members being such that each particle in said regenerating chamber during its entire regenerating period is within about two inches of at least one of said tubular members so that the temperature of all particles may be maintained within a suitable regenerating temperature range without any deleterious temperature occurring, means to circulate temperature-controlled liquid heat exchange medium through said tubular members, means to maintain the temperature of said circulating medium above inefficient regenerating temperatures but below catalyst damaging temperatures, means to flow a gaseous regenerating agent through said regenerating chamber, countercurrently to said particles, baffle means disposed throughout the regenerating portion of said regenerating chamber, said baffle means being disposed so as to force substantially all catalyst particles and gas passing through the regenerating chamber to follow a tortuous path and so as to form substantially continuous, particle-free gas passages through the moving particles, which passages permit the gas therein to directly contact the particles along at least one edge of said passages, and means for returning regenerated catalyst from said regenerating chamber to said conversion chamber.

2. A continuous catalytic conversion unit for conversion of a hydrocarbon oil reactant with a catalyst composed of solid particles followed by regeneration of the spent catalyst with a gaseous regenerating agent reactant wherein conversion may be continuously carried out in one element without interruption comprising a conversion chamber constructed so that said catalyst particles may be flowed through said chamber in its normally operative form, means to simultaneously flow said hydrocarbon reactant through the said chamber in direct contact with said particles, means to pass spent catalyst from said conversion chamber to a regenerating chamber out of reactant communication with said conversion chamber, said regenerating chamber being constructed so that said spent catalyst may be flowed downwardly therethrough in its normally operative form, a plurality of heat conducting tubular members positioned within said regenerating chamber and adapted to carry a circulating liquid heat exchange medium in indirect heat transfer relationship with particles flowing through said regenerating chamber, the structure and positioning of said tubular members being such that each particle in said regenerating chamber during its entire regenerating period is within sufficiently close indirect heat exchange with at least one of said tubular members that the temperature of all particles may be maintained within a suitable regenerating temperature range without any deleterious temperature occurring, means to circulate properly temperature-controlled liquid heat exchange medium through said tubular members, means to flow a gaseous regenerating agent through said regenerating chamber countercurrently to said particles, baffle means disposed in the regenerating portion of said regenerating chamber, said baffle means being so disposed as to repeatedly redistribute said downflowing particles in such manner that paths are formed for the gaseous agent whereby it does not have to force its way upwardly through any substantial depth of unbaffled particles, and means for returning regenerated catalyst from said regenerating chamber to said conversion chamber.

3. A continuous catalytic conversion unit for conversion of a hydrocarbon oil reactant with a catalyst composed of solid particles followed by regeneration of the spent catalyst with a gaseous regenerating agent reactant wherein conversion may be continuously carried out in one element without interruption comprising a conversion chamber constructed so that said catalyst particles may be flowed through said chamber in its normally operative form, means to simultaneously flow said hydrocarbon through said chamber in direct contact with said particles, means to pass spent catalyst from said conversion chamber to a regenerating chamber out of reactant communication with said conversion chamber, said regenerating chamber being constructed so that said spent catalyst may be flowed downwardly therethrough in its normally operative form, a plurality of heat conducting tubular members positioned within said regenerating chamber and adapted to carry a circulating liquid heat exchange medium in indirect heat transfer relationship with particles flowing through said regenerating chamber, the structure and positioning of said tubular members being such that each particle in said regenerating chamber during its entire regenerating period is within about two inches of at least one of said tubular members so that the temperature of all particles may be maintained within a suitable regenerating temperature range without any deleterious temperature occurring, means to flow liquid heat exchange medium in a circuit through said tubular members in said regenerating chamber, said circuit containing a heat control element for properly readjusting the temperature of said heat transfer medium, means to flow a gaseous regenerating agent through said regenerating chamber countercurrently to said particles, baffle means disposed throughout the regenerating portion of said regenerating chamber, said baffle means being disposed so as to force substantially all catalyst particles and gas passing through the regenerating chamber to follow a tortuous path and so as to form substantially continuous, particle-free gas passages through the moving particles which passages permit the gas therein to directly contact the particles along at least one surface of said passages, and means for returning regenerated catalyst from said regenerating chamber to said conversion chamber.

4. A continuous catalytic conversion unit for the conversion of a fluid reactant by contact with catalyst particles followed by regeneration of the catalyst with a gaseous regenerating agent reactant wherein conversion may be continuously carried out in one element without interruption, comprising a conversion chamber so constructed that said catalyst particles may be flowed through said chamber in its normally operative form, means to simultaneously flow said fluid reactant through the said chamber in direct contact with said catalyst particles, means to pass spent catalyst particles from said conversion chamber to a regeneration chamber out of reactant communication with said conversion chamber, said regeneration chamber being constructed so that said spent catalyst particles may be flowed therethrough in its normally operative form, means to simultaneously flow said gaseous regenerating agent countercurrently through the said regeneration chamber in direct contact with said spent catalyst, baffle means disposed in the regenerating portion of said regenerating chamber, said baffle means being positioned so as to force substantially all catalyst particles and gas to follow a tortuous path and so as to form substantially continuous, particle-free gas passages through the moving particles which passages permit the gas therein to directly contact the particles along at least one surface of said passages, means for controlling the temperature of all the particles in said regenerating chamber between the minimum regenerating temperature and the maximum regenerating temperature that does not substantially heat damage the particles, and means for returning regenerated catalyst from said regenerating chamber to said conversion chamber.

5. The apparatus of claim 1 wherein said baffle means disposed throughout said regenerating chamber comprise layers of angle irons positioned between said tubular members with their angles opening downwardly, the angle irons of each layer being transverse to those of adjoining layers, and each of said angle irons having a series of orifices along its heel and said orifices being so located in any angle iron that they will be directly below the closed part of the next above angle iron crossing thereover.

6. The apparatus of claim 2 wherein said baffle means disposed throughout said regenerating chamber comprise layers of angle irons positioned between said tubular members with their angles opening downwardly, the angle irons of each layer being transverse to those of adjoining layers, and each of said angle irons having a series of orifices along its heel and said orifices being so located in any angle iron that they will be directly below the closed part of the next above angle iron crossing thereover.

7. The apparatus of claim 1 wherein said baffle means disposed throughout said regenerating chamber comprise helical fins attached to said tubular members, said fins extending out from said tubular members sufficiently that the outer peripheries of the fins on adjoining tubes are at least in substantially vertical alignment.

8. The apparatus of claim 2 wherein said baffle means disposed throughout said regenerating chamber comprise helical fins attached to said tubular members, said fins extending out from said tubular members sufficiently that the outer peripheries of the fins on adjoining tubes are at least in substantially vertical alignment.

9. Apparatus for catalytically cracking heavier petroleum oil to gasoline comprising a chamber so constructed that cracking catalysts composed of solid particles may be gravitated therethrough as substantially a solid column of particles in its normally operative form, means to pass said petroleum oil countercurrently through said chamber, within said chamber a structure consisting substantially only of baffle means disposed within said chamber in such manner as to form a plurality of substantially continuous, particle-free passages up through said chamber when said particles gravitate therethrough and which permit oil passing through said passages to directly contact said particles along at least one surface of said passages, said baffle means so obstructing the cross area of said chamber that substantially all the oil and particles passing through said chamber must follow tortuous paths, and the length of said paths being sufficient to permit the production of a substantially improved gasoline product in yield and acid-heat value per volume of oil per volume of catalyst per cycle over the gasoline product that could be obtained by passing said oil through a stationary bed of the catalyst contacted thereby.

10. A cyclic catalytic hydrocarbon conversion reaction wherein moving active alumina-silica particles are directly contacted with a moving stream of petroleum oil to be cracked and a regeneration reaction wherein the spent catalyst from said catalytic reaction is regenerated by directly contacting the spent catalyst with a gaseous regenerating agent while both are moving, which comprises gravitating the active catalyst through a cracking zone as substantially a solid column of particles in direct contact with rising vapors of said petroleum oil under cracking conditions, baffling said column of particles to form a plurality of substantially continuous, particle-free passages therethrough which permit said oil vapors to rise therein and directly contact said particles along at least one surface of said passages, the length of contact of said vapors and catalyst in said cracking zone being sufficient to give a substantially improved gasoline product in yield and acid heat value per volume oil per volume of catalyst per cycle from that which could be obtained by passing said petroleum vapors through a stationary bed of the catalyst contacted thereby, withdrawing spent catalyst particles from said cracking zone, passing said spent particles into a regenerating zone without permitting them to cool to atmospheric temperature, gravitating said spent catalyst under regenerating conditions through said regenerating zone as substantially a solid column of particles, baffling said column of particles to form a plurality of substantially continuous, particle-free passages therethrough which permit gas therein to directly contact said particles along at least one surface of said passages, passing said gaseous regenerating agent up through said particles by way of said passages, circulating a sufficient amount of molten salt heat exchange medium, maintained at a temperature between the minimum regeneration temperature for the catalyst and the maximum regeneration temperature which does not heat damage the catalyst, in close indirect heat exchange relationship with every catalyst particle in said regenerating zone so that heat transfer surface controlled thereby is within about two inches of all particles in said regenerating zone whereby their temperature is maintained within a proper regenerating temperature range without any deleterious temperature occurring, returning regenerated catalyst particles from said regenerating zone to the cracking zone without permitting them to cool to atmospheric temperature, and preventing said petroleum vapors passing into said regenerating zone at all times and preventing said regenerating agent passing into said cracking zone at all times.

11. A cyclic catalytic hydrocarbon conversion reaction wherein moving active catalyst particles are directly contacted with a moving stream of petroleum oil to be converted at elevated temperatures and a regeneration reaction wherein the spent catalyst from said catalytic reaction is regenerated by directly contacting the spent catalyst with a gaseous regenerating agent at elevated temperatures while both are moving, which comprises moving the active catalyst through a conversion zone in direct contact with said petroleum oil under conversion conditions, withdrawing spent catalyst particles from said conversion zone, passing said spent catalyst into a regenerating zone without permitting them to cool to atmospheric temperature, gravitating said spent catalyst particles through said regenerating zone, baffling said gravitating particles so that they are repeatedly redistributed in such manner that paths are formed for the gaseous agent whereby it may pass up through the regenerating zone in direct contact with the particles without forcing its way through any substantial depth of unbaffled particles, passing said gaseous regenerating agent upwardly through said particles by way of said passages, circulating a sufficient amount of a properly temperature-controlled liquid heat exchange medium within sufficiently close indirect heat exchange with the catalyst particles in said regenerating zone, that the temperature of all particles in said regenerating zone is maintained within a proper regenerating temperature range without any deleterious temperature occurring, returning regenerated catalyst particles from said regenerating zone to the conversion zone without permitting them to cool to atmospheric temperature, and preventing said petroleum oil passing into said regenerating zone at all times and preventing said regenerating agent passing into said conversion zone at all times.

12. A catalytic hydrocarbon conversion reaction wherein moving active catalyst particles are directly contacted with a moving stream of hydrocarbon material to be converted at elevated temperatures and a regeneration reaction wherein the spent catalyst from said catalytic reaction is regenerated by directly contacting the spent catalyst with a gaseous regenerating agent at elevated temperatures while both are moving, which comprise gravitating the active catalyst through a conversion zone as a substantially solid column of particles, passing a stream of said hydrocarbon material under conversion conditions up through said moving column of particles by way of a plurality of substantially continuous, particle-free passages which permit the hydrocarbon therein to directly contact said particles along at least one surface of said passages, withdrawing spent catalyst particles from said conversion zone, passing said spent particles into a regenerating zone without permitting them to cool to atmospheric temperature, gravitating said spent catalyst under regenerating conditions through said regenerating zone as a substantially solid column of particles, passing said gaseous regenerating agent up through said moving column of particles by way of a plurality of substantially continuous, particle-free passages which permit the gas therein to directly contact said particles along at least one surface of said passages, circulating a sufficient amount of a properly temperature-controlled liquid heat exchange medium within sufficiently close indirect heat exchange with the catalyst particles in said regenerating zone that the temperature of all particles in said regenerating zone is maintained within a proper regenerating temperature range without any deleterious temperature occurring, returning regenerated catalyst particles from said regenerating zone to the conversion zone without permitting them to cool to atmospheric temperature, and preventing said hydrocarbon reactant passing into said regeneration zone at all times and preventing said regenerating agent passing into said conversion zone at all times.

13. The method of cracking heavier petroleum oil to gasoline which comprises gravitating a clay cracking catalyst composed of relatively small particles through a cracking zone as a substantially solid column of particles, flowing vapors of said heavier oil under cracking conditions upwardly through said downwardly gravitating column of particles by way of a plurality of substantially continuous, particle-free vapor passages through said column which permit direct contact of vapors therein with said particles along at least one surface of said passages, the length of path of contact of said countercurrently moving vapors and catalyst particles being sufficient to give a substantially improved gasoline product in yield and acid-heat value per volume of oil per volume of catalyst per unit of on stream time over the gasoline product which could be obtained by passing said vapors through a stationary bed of the catalyst contacted thereby.

14. The apparatus of claim 3 wherein said baffle means disposed throughout said regenerating chamber comprise layers of angle irons positioned between said tubular members with their angles opening downwardly, the angle irons of each layer being transverse to those of adjoining layers, and each of said angle irons having a series of orifices along its heel and said orifies being so located in any angle iron that they will be directly below the closed part of the next above angle iron crossing thereover.

15. The apparatus of claim 3 wherein said baffle means disposed throughout said regenerating chamber comprise helical fins attached to said tubular members, said fins extending out from said tubular members sufficiently that the outer peripheries of the fins on adjoining tubes are at least in substantially vertical alignment.

16. The method of converting fluid petroleum hydrocarbons to high quality gasoline which comprises passing a substantially compact column of catalyst particles of between about 20 and about 100 mesh size downwardly through a conversion zone, baffling the particles in said moving column so as to form a plurality of substantially continuous, particle-free vapor passages therethrough, and flowing said petroleum hydrocarbons in vapor form under conversion conditions countercurrently through said moving column of catalyst by way of said vapor passages so that the vapors pass through the conversion zone in direct contact with the catalyst particles but without having to be forced through any substantial area of closely packed particles.

17. The method of catalytically converting a fluid petroleum hydrocarbon into high quality gasoline which comprises flowing said hydrocarbon in vapor form under conversion conditions through a conversion zone in contact with moving catalyst particles, removing spent catalyst particles from the conversion zone, passing said removed spent catalyst substantially free of hydrocarbon vapors to a regeneration zone, passing said spent catalyst through said regeneration zone in the form of a substantially compact column of particles, baffling the particles in said moving column of spent catalyst so as to form a plurality of substantially continuous, particle-free gas passages therethrough, flowing a combustion-supporting regenerating gas under combustion conditions countercurrently through said moving column of catalyst by way of said gas passages so that the catalyst is regenerated at high temperature by the gas passing through the regeneration zone in direct contact with the catalyst particles but without having to be forced through any substantial area of closely packed particles, returning the high temperature regenerated catalyst substantially directly to the conversion zone for effecting the conversion reaction, and substantially excluding combustion-supporting gases from the conversion reaction.

18. The method of catalytically cracking a heavier liquid petroleum hydrocarbon to high quality gasoline which comprises passing a substantially compact column of catalyst particles of between about 20 and about 100 mesh size so that they pack closely together downwardly through a conversion zone, baffling the particles in said moving column so as to form a plurality of substantially continuous particle-free vapor passages therethrough, flowing said hydrocarbon in vapor form under conversion conditions counter-currently through said moving column of catalyst by way of said vapor passages so that the vapors pass through the conversion zone in direct contact with the catalyst particles but without having to be forced through any substantial area of closely packed particles, removing spent catalyst particles from the conversion zone, passing said removed spent catalyst substantially free of hydrocarbon vapors to a regeneration zone, passing said spent catalyst through said regeneration zone in the form of a substantially compact column of particles, baffling the particles in said moving column of spent catalyst so as to form a plurality of substantially continuous, particle-free gas passages therethrough, flowing a combustion-supporting regenerating gas under combustion conditions counter-currently through said moving column of spent catalyst by way of said gas passages so that the catalyst is regenerated at high temperature by the gas passing through the regeneration zone in direct contact with the catalyst particles but without having to be forced through any substantial area of closely packed particles, returning the high temperature regenerated catalyst substantially directly to the conversion zone for effecting the conversion reaction, and substantially excluding combustion-supporting gases from the conversion reaction.

19. The method of operating a cyclic process for conversion of fluid petroleum hydrocarbons to high quality gasoline which comprises passing a flowing stream of solid catalyst material in the form of small particles through a conversion zone and a regeneration zone without substantial heat losses therebetween, in the conversion zone passing said catalyst as a substantially compact column downwardly through said zone, baffling the particles in said moving column so as to form a plurality of substantially continuous, particle-free vapor passages therethrough, flowing said petroleum hydrocarbons in vapor form under conversion conditions countercurrently through said moving column of catalyst by way of said vapor passages so that the vapors pass through the conversion zone in direct contact with the catalyst particles but without having to be forced through any substantial area of closely-packed particles; passing spent catalyst from said conversion zone into a regeneration zone and moving it therethrough as a substantially compact column, passing regenerating gas under combustion conditions through the catalyst column in said regeneration zone, and in said regeneration zone bringing said catalyst into heat transferring relationship with a heat transfer medium at a controlled temperature to prevent the temperature of the catalyst during regeneration from rising to levels damaging to the catalyst.

20. The method of catalytically converting a fluid petroleum hydrocarbon into high quality gasoline which comprises flowing said hydrocarbon in vapor form under conversion conditions through a conversion zone in contact with moving catalyst particles, removing spent catalyst particles from the conversion zone, passing said removed spent catalyst substantially free of hydrocarbon vapors to a regeneration zone, passing said spent catalyst through said regeneration zone in the form of a substantially compact column of particles, baffling the particles in said moving column of spent catalyst so as to form a plurality of substantially continuous, particle-free gas passages therethrough, flowing a combustion-supporting regenerating gas under combustion conditions countercurrently through said moving column of catalyst by way of said gas passages so that the catalyst is regenerated at high temperature by the gas passing through the regeneration zone in direct contact with the catalyst particles but without having to be forced through any substantial area of closely packed particles, extracting heat from the catalyst in said regeneration zone in amount sufficient to prevent rise of catalyst temperature to levels damaging to said catalyst, returning the high temperature regenerated catalyst substantially directly to the conversion zone for effecting the conversion reaction, and substantially excluding combustion-supporting gases from the conversion reaction.

21. A continuous catalytic conversion unit for conversion of a hydrocarbon oil reactant with a catalyst composed of solid particles followed by regeneration of the spent catalyst with a gaseous regenerating agent reactant wherein conversion may be continuously carried out in one element without interruption comprising a conversion chamber constructed so that said catalyst particles may be flowed through said chamber in its normally operative form, means to simultaneously flow said hydrocarbon reactant countercurrently through said chamber in direct contact with said particles, baffle means disposed throughout the conversion portion of said chamber, said baffle means being disposed so as to force substantially all catalyst particles and hydrocarbons passing through the chamber to follow a tortuous path and so as to form substantially continuous, particle-free passages for the hydrocarbons through the moving particles which passages permit hydrocarbons therein to directly contact the particles along at least one edge of said passages, means to pass spent catalyst from said conversion chamber to a regenerating chamber out of reactant communication with said conversion chamber, said regenerating chamber being constructed so that said spent catalyst may be flowed downwardly therethrough in its normally operative form, a plurality of heat conducting tubular members positioned within said regenerating chamber and adapted to carry a circulating fluid heat exchange medium in indirect heat transfer relationship with particles flowing through said regenerating chamber, means to circulate temperature-controlled fluid heat exchange medium through said tubular members, means to maintain the temperature of said circulating medium above inefficient regenerating temperatures but below catalyst damaging temperatures, means to flow a gaseous regenerating agent through said regenerating chamber, countercurrently to said particles, and means for returning regenerated catalyst from said regenerating chamber to said conversion chamber.

22. The method of operating a cyclic process for conversion of fluid petroleum hydrocarbons to high-quality gasoline which comprises passing a flowing stream of solid catalyst material in the form of small particles through a conversion zone and a regeneration zone without substantial heat losses therebetween, in the conversion zone passing said catalyst as a substantially-compact column downwardly through said zone, baffling the particles in said moving column so as to form a plurality of substantially-continuous, particle-free vapor passages therethrough, flowing said petroleum hydrocarbons in vapor form under conversion conditions through said moving column of catalyst by way of said vapor passages so that the vapors pass through the conversion zone in direct contact with the catalyst particles but without having to be forced through any substantial area of closely-packed particles; passing spent catalyst from said conversion zone into a regeneration zone and moving it therethrough as a substantially-compact column, passing regenerating gas under combustion conditions through the catalyst column in said regeneration zone, and in said regeneration zone bringing said catalyst into indirect heat-transfer relationship with a heat-transfer medium at a controlled temperature to prevent the temperature of the catalyst during regeneration from rising to levels damaging to the catalyst.

23. The process of claim 22, wherein the catalyst is purged by passing steam therethrough during passage from the conversion zone to the regeneration zone and during passage from the regeneration zone to the conversion zone.

THOMAS P. SIMPSON.
JOHN W. PAYNE.
JOHN A. CROWLEY, Jr.

CERTIFICATE OF CORRECTION.

Patent No. 2,331,433.   October 12, 1943.

THOMAS P. SIMPSON, ET AL.

It is hereby certified that error appears in the printed specification of the above numbered patent requiring correction as follows: Page 1, first column, line 27-28, for "approprite" read --appropriate--; page 7, first column, line 20, Table 1, for "throughout" read --throughput--; and that the said Letters Patent should be read with this correction therein that the same may conform to the record of the case in the Patent Office.

Signed and sealed this 21st day of December, A. D. 1943.

(Seal)

Henry Van Arsdale,
Acting Commissioner of Patents.